US012644039B2

(12) United States Patent (10) Patent No.: US 12,644,039 B2
Downey (45) **Date of Patent: \*Jun. 2, 2026**

(54) SYSTEM AND METHOD FOR OPTIMIZED PRODUCTION OF HYDROCARBONS FROM SHALE OIL RESERVOIRS VIA CYCLIC INJECTION

(71) Applicant: Shale Ingenuity, LLC, Centennial, CO (US)

(72) Inventor: Robert A. Downey, Centennial, CO (US)

(73) Assignee: Shale Ingenuity, LLC, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,634

(22) Filed: Dec. 30, 2024

(65) Prior Publication Data

US 2025/0171680 A1     May 29, 2025

Related U.S. Application Data

(63) Continuation of application No. 18/545,652, filed on Dec. 19, 2023, now Pat. No. 12,180,422, which is a continuation of application No. 17/138,355, filed on Dec. 30, 2020, now Pat. No. 11,851,609.

(60) Provisional application No. 62/955,205, filed on Dec. 30, 2019.

(51) Int. Cl.
*E21B 47/06*     (2012.01)
*C09K 8/594*     (2006.01)
*E21B 49/08*     (2006.01)

(52) U.S. Cl.
CPC .............. *C09K 8/594* (2013.01); *E21B 47/06* (2013.01); *E21B 49/087* (2013.01); *E21B 2200/20* (2020.05)

(58) Field of Classification Search
CPC ...... E21B 43/16; E21B 43/164; E21B 43/168; E21B 47/06; E21B 49/087; E21B 2200/20; C09K 8/594
See application file for complete search history.

(56) References Cited

U.S. PATENT DOCUMENTS

| | | | | |
|---|---|---|---|---|
| 5,413,177 | A | * 5/1995 | Horton | E21B 43/168 |
| | | | | 166/305.1 |
| 5,607,016 | A | * 3/1997 | Butler | E21B 43/30 |
| | | | | 166/266 |
| 9,840,899 | B2 | * 12/2017 | Murrell | E21B 43/2605 |
| 9,932,808 | B2 | * 4/2018 | Sheng | E21B 43/255 |
| 10,487,635 | B2 | * 11/2019 | Sheng | E21B 43/168 |

(Continued)

*Primary Examiner* — Matthew R Buck
(74) *Attorney, Agent, or Firm* — Dickinson Wright PLLC; Ross Spencer Garsson

(57) ABSTRACT

System and method for the optimized production of hydrocarbons from shale oil reservoirs via cyclic injection to achieve an improved and optimal recovery of oil. The method can determine and optimize the composition of injected fluids to be injected, the rate, pressure and duration of injection, the production rate and pressure of produced fluids; can determine and utilize the optimum number of injection and production cycles; can determine the amount of soaking time (if any); and can determine the equipment design and operating characteristics to provide for the optimized injection of injection fluids, and the separation of produced fluids for both reinjection and delivery to sales or storage.

20 Claims, 6 Drawing Sheets

(56)  References Cited

U.S. PATENT DOCUMENTS

| | | | | |
|---|---|---|---|---|
| 11,506,815 B2 * | 11/2022 | Johns | ..................... | E21B 47/06 |
| 11,851,609 B2 * | 12/2023 | Downey | ............... | E21B 43/166 |
| 12,180,422 B2 * | 12/2024 | Downey | ............... | E21B 43/168 |

* cited by examiner

SYSTEM AND METHOD FOR OPTIMIZED PRODUCTION OF HYDROCARBONS FROM SHALE OIL RESERVOIRS VIA CYCLIC INJECTION

RELATED PATENTS AND PATENT APPLICATIONS

This application is a continuation of U.S. patent application Ser. No. 18/545,652, filed Dec. 19, 2023, entitled "System And Method For Optimized Production Of Hydrocarbons From Shale Oil Reservoirs Via Cyclic Injection," which is a continuation of U.S. Patent Application Ser. No. 17/138,355, filed Dec. 30, 2020, entitled "System And Method For Optimized Production Of Hydrocarbons From Shale Oil Reservoirs Via Cyclic Injection." which application claims priority to U.S. Provisional Patent Application Ser. No. 62/955,205, filed Dec. 30, 2019, entitled "System And Method For Optimized Production Of Hydrocarbons From Shale Oil Reservoirs Via Cyclic Injection." These patent application are commonly assigned to the Assignee of the present invention and is are incorporated herein by reference in its their entirety for all purposes.

TECHNICAL FIELD

The present invention generally relates to the production of liquid oil from shale reservoirs. More particularly, the present disclosure relates to methods and processes for the optimization of liquid oil production by cyclic injection of hydrocarbon-containing liquids and their recovery, adjustment and reinjection to achieve an improved and optimal oil recovery.

BACKGROUND

Shale oil resources have become the focus of the development for the production of crude oil and associated natural gas in the United States over the past 12 years. These shale reservoirs are characterized by thick, continuous deposits of very fine-grained materials with oil and gas interspersed in very small pore spaces in the matrix. Permeability of these shales is very low, and as a result the recovery of the oil and gas therefrom is limited in most cases to only 3-10 percent. Methods for improving or enhancing the recovery of the oil from these shale resources may be derived from commonly employed enhanced recovery processes such as thermal injection, gas injection, liquid injection and chemical injection.

Thermal injection enhanced oil recovery utilizes steam or hot water or hot solvents to extract crude oil from the reservoir. Chemical injection enhanced oil recovery utilizes polymers, surfactant solutions, acids or alkali to extract crude oil from the reservoir. Gas injection enhanced oil recovery utilizes gases, such as carbon dioxide, to enhance the recovery of crude oil from the reservoir, and it is the most common application for enhanced oil recovery, with numerous projects in operation in the United States. Carbon dioxide is used in the process due to its high miscibility in crude oil.

Enhanced oil recovery utilizing these methods has been underway for many years and has resulted in the recovery of millions of barrels of oil. Today, there are over 150 EOR projects underway in the US, producing more than 300,000 barrels of oil per day. These are all projects producing from conventional oil reservoirs, having permeabilities of about 1 millidarcy or more.

The advent of oil production from shale oil and gas reservoirs around 2008 was brought about by efficient horizontal drilling and multiple stage hydraulic fracture stimulation technology development. Because the permeability of these shale oil and gas reservoirs is much lower than 1 millidarcy, primary production via pressure depletion results in the recovery of only a few percent of the oil in place. Enhanced oil recovery via continuous injection of gas does not work. However, some oil and gas producing companies have found that cyclic injection of natural gas can cause significant increased oil recovery, and there are about 250 wells now producing via cyclic injection, also known as "huff and puff."

There have been about 70,000 horizontal shale oil and gas wells drilled in the US as of today. Production from these wells is characterized by high initial flow rates of oil and gas, and a rapid decline in production over the first year, followed by a hyperbolic decline thereafter. Economic production from these wells may continue for 9-15 years. Today, there are over 4000 horizontal shale oil wells whose production has declined to or near an economic limit rate.

Thus, there is a need to provide methods for utilizing these existing wellbores to recover more of the oil remaining in these shale reservoirs. Wan 2013 proposed cyclic gas injection (huff and puff) to improve oil recovery in shale oil reservoirs. Sheng 2015 reported on several papers published on cyclic gas injection, and used a simulation approach to show that cyclic gas injection may provide the best potential for enhanced recovery (EOR) of oil in shale oil reservoirs. Sheng 2017 demonstrated a method to optimize the recovery of oil via cyclic gas injection by maximizing the injection rate and pressure during the injection period, and by setting the minimum production pressure during production period. However, the method does not provide for optimizing the composition of the injection gases so as to maximize the recovery of the oil remaining in the shale oil reservoir during the cyclic injection process, nor the system required to enable the optimization process.

Therefore, a need remains to improve the cyclic gas injection method to optimize the oil recovery from shale reservoirs.

SUMMARY OF THE INVENTION

The present invention relates to the production of oil from shale reservoirs. A process has been discovered to optimize oil recovery via cyclic injection or huff and puff method in which certain components of natural gas that are in liquid state at surface injection conditions are injected to achieve an improved and optimal oil recovery.

In embodiments of the current invention, hydrocarbon gases (such as propane, butane, pentane, hexane, carbon dioxide, nitrogen and carbon monoxide and combinations thereof), in liquid or gaseous state at surface injection conditions, are injected. The process increases liquid oil production by cyclic injection and production in shale reservoirs to achieve an optimum oil recovery. The invention features a method to increase recovery of oil from shale reservoirs by a cyclic gas injection process that includes a plurality of injection and production periods.

In embodiments of the current invention, the injection gas composition, maximum injection rate and maximum injection pressure during the injection period, and the maximum oil and gas production rates and minimum production during the production period, are determined by reservoir oil composition, reservoir conditions, operation constraints and surface facilities capacity. The injection period is the time required for the pressure near the wellbore to reach the desired maximum injection pressure. The production period is the time required for the pressure near the wellbore to reach the set minimum production pressure. The injection gas composition is that combination of natural gas and other gas components that compositional reservoir simulation modeling indicates will result in optimum or highly beneficial recovery of oil during the injection and production cycle. In some embodiments, the well may be shut in following the injection period to provide a soaking time for the injected gases to mix with the reservoir oil. The benefits of soaking time may not compensate the loss in production due to the time lost in the soaking period, as a result the soaking step may be eliminated during the cyclic gas injection process in shale oil reservoirs.

In embodiments of the current invention, the injection of natural gas and other gases components in the liquid or near-liquid state at surface injection conditions mitigates the need for high volume, high pressure natural gas compression equipment, and high pressure flowlines, valves, fittings and wellheads; and the need to purchase natural gas. The natural gas and other gases components in the liquid or near-liquid state at surface injection conditions can be trucked or flowed to the well location, stored at or near the well location and rapidly pumped into the well at the desired rate and injection pressure using conventional liquid pumping equipment.

In embodiments of the current invention, the production of oil and injected natural gases and other gases components are directed through equipment at or near the well location to separate the oil, gas containing methane and ethane from the injected natural gas, and other gases components in the liquid or near-liquid state at surface injection conditions. The recovered natural gas and other gases components in the liquid or near-liquid state at surface injection conditions are then accumulated to a desired volume and reinjected in subsequent cycles of injection and production.

In embodiments of the current invention, the production of oil and injected natural gases and other gases components are analyzed for composition and a compositional reservoir simulation model may be utilized to assess the composition of the oil in the reservoir. The compositional reservoir simulation model may then be utilized to determine the composition of natural gas and other gases components in the liquid or near-liquid state at surface injection conditions that will optimize the recovery of oil in the reservoir, and that composition may be so adjusted, and injected.

In embodiments of the current invention, the composition of natural gas and other gases components in the liquid or near-liquid state at surface injection conditions may be amended to include surfactants, nano-surfactants and nanoparticle-containing surfactants that may improve oil recovery by lowering the interfacial tension of oil and the shale matrix.

In embodiments of the current invention, the composition of natural gas and other gases components in the liquid or near-liquid state at surface injection conditions may be amended to include carbon dioxide, carbon monoxide, ethane, or nitrogen in order to improve the recovery of oil.

In general, in one aspect, the invention features a method to increase the recovery of oil from shale reservoirs utilizing a cyclic injection and production process that includes a plurality of injection and production periods. The method includes the step of determining a hydrocarbon-containing composition for injection. The hydrocarbon-containing composition is in a liquid state at surface injection conditions. The method further includes the step of determining a maximum injection rate and a maximum injection pressure in a well to be utilized during a plurality of injection and production periods. The method further includes the step of determining the maximum production rate of gases and liquids from the well and the minimum production pressure during the plurality of injection and production periods. The method further includes the step of injecting the hydrocarbon-containing composition for a period of time such that the pressure near the wellbore of the well reaches the determined maximum injection pressure during the injection period. The method further includes the step of producing the well for a period of time such that the pressure at the wellbore reaches the determined minimum production pressure. The method further includes the step of, at or during the production period, assessing the composition of produced fluids and recalibrating a reservoir simulation model to determine the composition of the residual oil in the shale reservoir. The method further includes the step of processing the produced fluids at the surface to remove methane and ethane gases and hydrocarbons containing hexanes and greater molecular weight. The method further includes the step of adjusting the composition of the hydrocarbon-containing injection fluids. The method further includes the step of injecting the adjusted hydrocarbon-containing injection fluids. The method further includes the step of performing the process of the above-recited steps of the method repeatedly.

Implementations of the invention can include one or more of the following features:

The injection and production process can be not including a shut-in or soaking step between the injection and production process.

The injection and production process can include a shut-in or soaking step between the injection and production process.

The hydrocarbon-containing composition can include a fluid selected from a group consisting of ethane, propane, butane, heptane and hexane, carbon dioxide, and combinations thereof.

The hydrocarbon-containing composition can further include a gaseous substance selected from a group consisting of methane and carbon monoxide.

The hydrocarbon-containing composition can include a material selected from a group consisting of liquid surfactants, nano-surfactants, nanoparticles, and combinations thereof.

The hydrocarbon-containing composition can further include a fluid selected from a group consisting of ethane, propane, butane, heptane and hexane, carbon dioxide, and combinations thereof. The hydrocarbon-containing composition can further include a gaseous substance selected from a group consisting of methane and carbon monoxide.

The step of determining the maximum injection rate and maximum injection pressure during the injection periods can be determined based upon at least one of surface facilities capacities, reservoir and wellbore conditions, and operation constraints.

The step of determining the maximum production rate and minimum production pressure during the injection periods can be determined based upon at least one of surface facilities capacities, reservoir and wellbore conditions, and operation constraints.

The hydrocarbon-containing composition can be injected at a temperature of less than 50° F.

The increase in the recovery can be an increase of at least 75% versus primary recovery EUR.

The increase in the recovery can be an increase of at least 90% versus primary recovery EUR.

In general, in another aspect, the invention features a system for performing a method to increase the recovery of oil from a shale reservoir utilizing a cyclic injection and production process. The system includes a storage unit for storing a hydrocarbon-containing composition for injection. The hydrocarbon-containing composition is in a liquid state at surface injection conditions. The system further includes a plurality of wells operable for injecting and producing fluids from the shale reservoir. The system includes production equipment for receiving the fluids produced from one or more of the plurality of wells. The system includes a fluid separator operatively connected to the production equipment. The fluid separator can separate the fluids produced from the one or more plurality of wells into recycled fluids, produced gas, and produced oil. The fluid separator is operatively connected to the storage unit to permit the flow of the recycled The hydrocarbon-containing composition comprises the fluids to the storage unit.

recycled fluid. The fluid separator is operable to adjust the composition of the recycled fluids. The system includes a pumping system for injecting the hydrocarbon-containing composition into one or more the wells in the plurality of wells. The system is operable to perform the method to increase the recovery of the oil from the shale reservoir utilizing the cyclic injection and production process. The method includes the step of determining the composition of the hydrogen-containing composition for injection. The method further includes the step of determining a maximum injection rate and a maximum injection pressure in a well in the plurality of wells to be utilized during a plurality of injection and production periods. The method further includes the step of determining the maximum production rate of gases and liquids from the well and the minimum production pressure during the plurality of injection and production periods. The method further includes the step of injecting the hydrocarbon-containing composition for a period of time such that the pressure near the wellbore of the well reaches the determined maximum injection pressure during the injection period. The method further includes the step of producing the well for a period of time such that the pressure at the wellbore reaches the determined minimum production pressure. The method further includes the step of, at or during the production period, assessing the composition of produced fluids and recalibrating a reservoir simulation model to determine the composition of the residual oil in the shale reservoir. The method further includes the step of processing the produced fluids at the surface with the fluid separator to remove methane and ethane gases and hydrocarbons containing hexanes and greater molecular weight. The method further includes the step of adjusting the composition of the hydrocarbon-containing injection fluids. The method further includes the step of injecting the adjusted hydrocarbon-containing injection fluids. The method further includes the step of performing the process of the above-recited steps of the method repeatedly.

In general, in another aspect, the invention features a method that includes utilizing a compositional reservoir simulation model to determine the composition of residual crude oil remaining in a shale reservoir. The method further includes utilizing the composition reservoir simulation model to determine the composition of injection fluid for a cyclic injection and production process recovery of the residual crude oil. The injection fluid is a hydrocarbon-containing composition in a liquid state at surface injection conditions. The method further includes utilizing the composition reservoir simulation model to determine an injection period of time and a production period of time for the cyclic injection and production process in a well. The injecting of the hydrocarbon-containing composition for the injection period of time results in the pressure near the wellbore of the well reaches a determined maximum injection pressure during the injection period of time. The production of the well for the production period of time results in the pressure at the wellbore reaches a determined minimum production pressure. The method further includes performing the cyclic injection and production process in the well. The method further includes, at or during the production process, assessing the composition of the produced fluids and performing the above-recited steps of the method repeatedly.

DESCRIPTION OF DRAWINGS

For better understanding of the present invention, and the advantages thereof, reference is made to the following descriptions taken in conjunction with the accompanying drawings.

DETAILED DESCRIPTION

Figure 1:
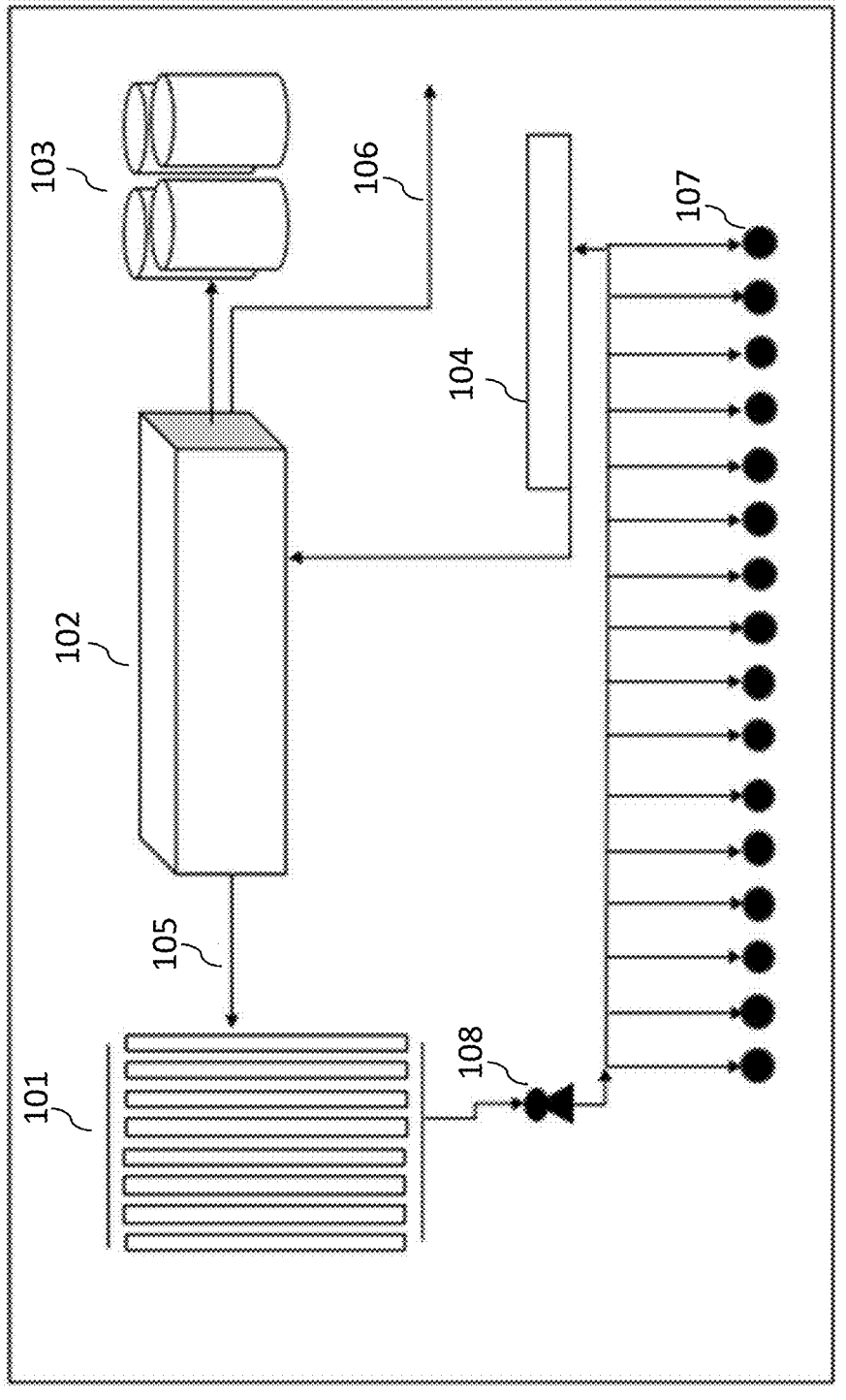
FIG. 1 is a schematic of surface equipment that may be located at a well pad to implement the process of the present invention.

The present invention generally relates to the production of liquid oil from shale reservoirs. More particularly, the present disclosure relates to methods and processes for the optimization of liquid oil production by cyclic injection of hydrocarbon-containing liquids and their recovery, adjustment and reinjection to achieve an improved and optimal oil recovery.

This includes systems and methods for the optimized production of hydrocarbons from shale oil reservoirs via cyclic injection to achieve an improved and optimal recovery of oil. The method can determine and optimize the composition of injected fluids to be injected, the rate, pressure and duration of injection, the production rate and pressure of produced fluids; can determine and utilize the optimum number of injection and production cycles; can determine the amount of soaking time (if any); and can determine the equipment design and operating characteristics to provide for the optimized injection of injection fluids, and the separation of produced fluids for both reinjection and delivery to sales or storage. The method can involve the injection of hydrocarbon-containing fluids in the liquid state at surface injection conditions into the shale oil reservoir wellbore, thereby mitigating the need for compression; however, the method can include the option of injecting hydrocarbon-containing fluids in the liquid and gaseous state at surface injection conditions.

The composition of the injection fluids can be adjusted in each injection cycle, as may be determined by compositional reservoir simulation modeling, so as to optimize the recovery of the residual oil in the shale oil reservoir. The injection cycle time is a period sufficiently long such that the pressure near the wellbore reaches the set maximum pressure during the injection period. The production cycle time in the process is the time required for the pressure near the wellbore to reach the set minimum production pressure during the production period. Soaking time may or may not be employed to optimize vaporization, solubilization or mixing of the injectant and reservoir hydrocarbons.

A compositional reservoir simulation model was constructed that utilized published geological and geophysical parameters describing the Niobara shale in the Wattenberg Field of the Denver Julesberg Basin of eastern Colorado. An area of the Wattenberg Field was selected that is representative of most Niobara formation horizontal wells in production, and that included a producing well that had approximately two years of production history.

PVT data from wells in the model area was utilized to construct an Equation of State, and the Equation of State was incorporated into the compositional reservoir simulation model. The compositional reservoir simulation model and EOS calculation model used was the GEM reservoir simulation model and the WinProp EOS model of the Computer Modeling Group, Calgary, Alberta, Canada.

The wellbore configuration, well completion and daily oil, gas, and water rate and surface pressure data for the well were input into the reservoir simulation model. The model was then run, varying key input parameters such as frac length, frac height, reservoir permeability, and fracture permeability, until a match of the historical production and pressure data was obtained.

The reservoir and well completion match parameters were then utilized to evaluate well performance under cyclic injection of hydrocarbon-containing liquids, specifically a mixture containing 50% propane and 50% butane.

In the simulation of cyclic injection, four cases were run:

Case 1: The liquid hydrocarbon mix was injected at a maximum rate of 2,000 barrels per day for a period of 10 days, at a maximum injection pressure of 3,000 psig at the surface. This maximum surface injection pressure approximates a bottomhole pressure gradient of 0.65 psi/foot of depth, slightly below the fracture gradient of 0.7 psi per foot of depth. The well was then flowed for a period of 50 days, with bottomhole pressure setpoints of 1000 psig, reduced to 500 psig. This cycle was then repeated.

Case 2: The liquid hydrocarbon mix was injected at a maximum rate of 2,000 barrels per day for a period of 5 days, at a maximum injection pressure of 3000 psig at the surface, and then the well was flowed for a period of 25 days, with bottomhole pressure setpoints of 1000 psig, then 500 psig.

Case 3: The liquid hydrocarbon mix was injected at a maximum rate of 2,000 barrels per day for a period of 10 days, at a maximum injection pressure of 3,000 psig at the surface, the well was shut in for a period of 10 days, and then the well was flowed for a period of 50 days, with bottomhole pressure setpoints of 1000 psig, then reduced to 500 psig. This cycle was then repeated.

Case 4: The liquid hydrocarbon mix was injected at a maximum rate of 2,000 barrels per day for a period of 5 days, at a maximum injection pressure of 3,000 psig at the surface, the well was shut in for a period of 5 days, and then the well was flowed for a period of 25 days, with bottomhole pressure setpoints of 1000 psig, then reduced to 500 psig. This cycle was then repeated.

FIG. 1 shows surface equipment that may be located at a well pad to implement such cyclical injection. This equipment includes storage 101 (for storing the liquid hydrogen mix to be injected via pumping system 108 to wells 107), EOR production equipment 104 (for recovering the fluids produced from wells 107), processing skid 102 (for separating the fluids produced), and oil storage tanks 103. For example, processing skid 102 can remove methane and ethane gases and hydrocarbons containing hexanes and greater molecular weight. Some of the fluids recovered can be recycled utilizing recycle stream 105 from processing skid 102 to storage 101. Recovered gas can be flowed from processing skid 102 (to mainstream) via gas stream 106.

Figure 2:
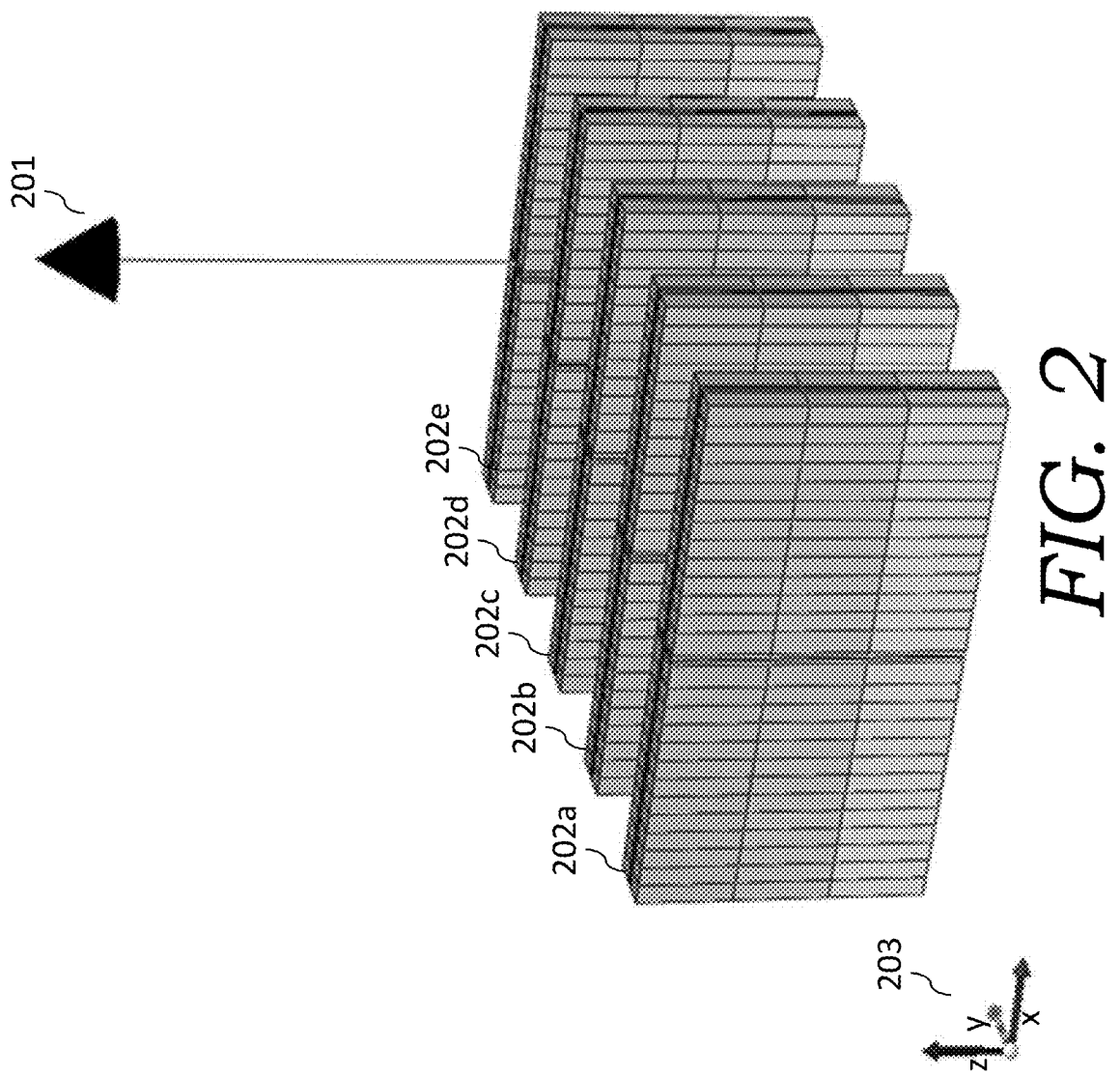
FIG. 2 is a schematic of a base simulation model used for an embodiments of the present invention.

FIG. 2 is a schematic of the base simulation model used for the compositional reservoir simulation model. This schematic shows well location (such as well-1 201), fractures 202a-202e, grid dimensions, and x-y-z directions 203.

Figure 3:
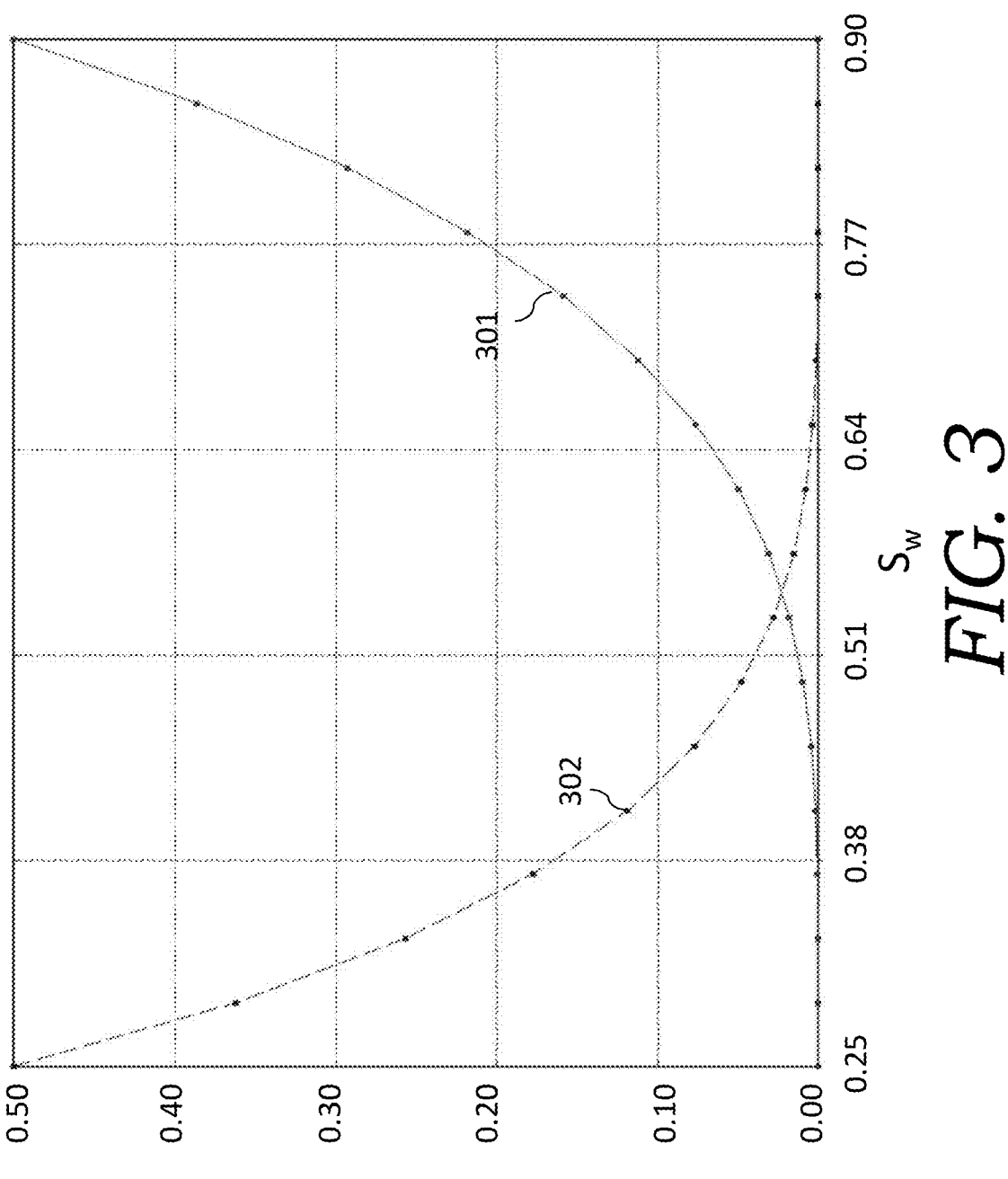
FIG. 3 is a graph indicating the water and oil relative permeability versus water saturation of a reservoir analyzed using an embodiment of the present invention.
Figure 4:
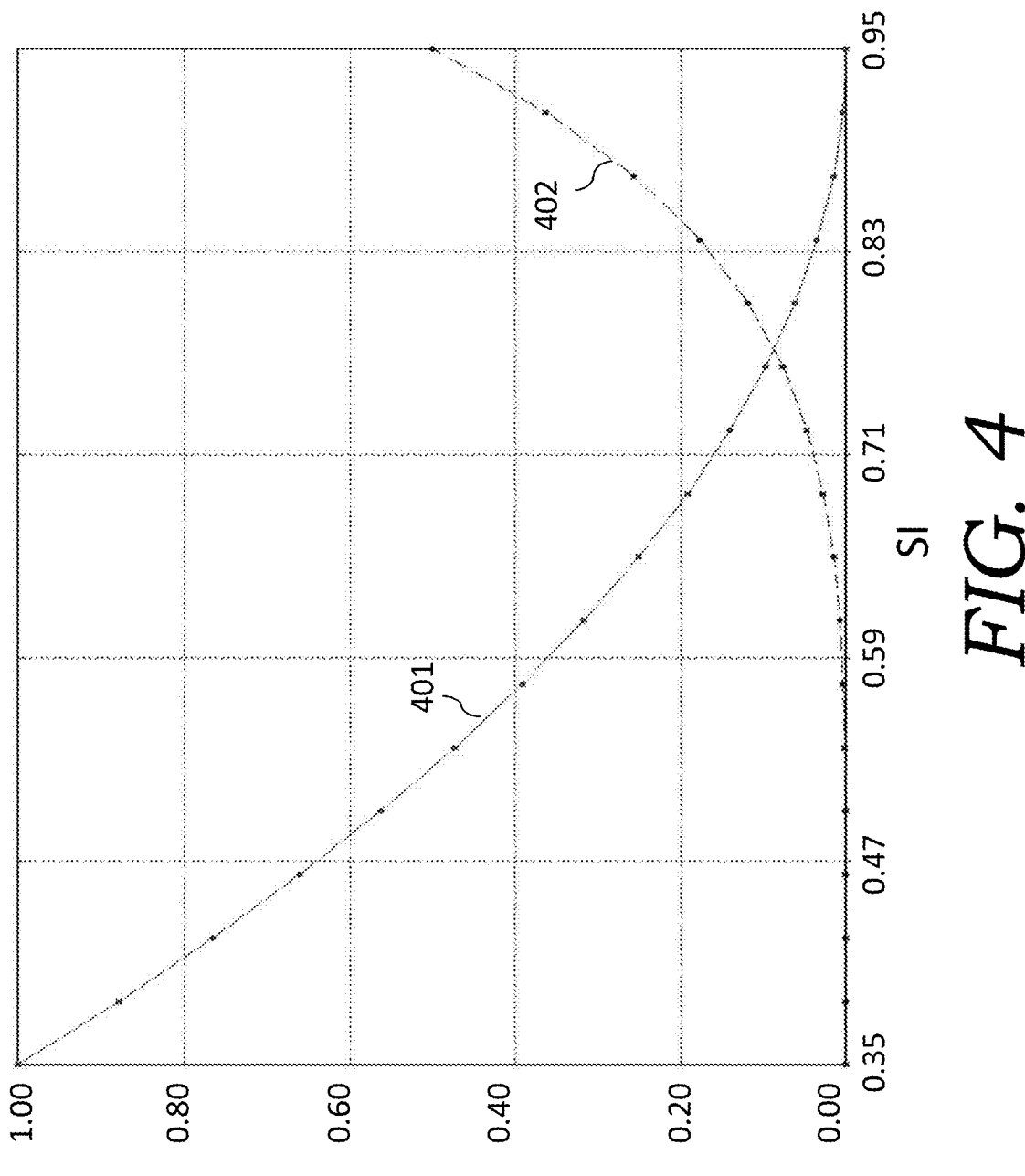
FIG. 4 is a graph indicating the gas and oil relative permeability versus water saturation of a reservoir analyzed using an embodiment of the present invention.

FIG. 3 indicates the water and oil relative permeability versus water saturation of the reservoir analyzed. Plot 301 is krw vs Sw, and plot 302 is krow VS Sw. FIG. 4 indicates the gas and oil relative permeability versus water saturation of the reservoir analyzed. Plot 401 is krg vs SI, and plot 402 is krog VS SI.

Figure 5:
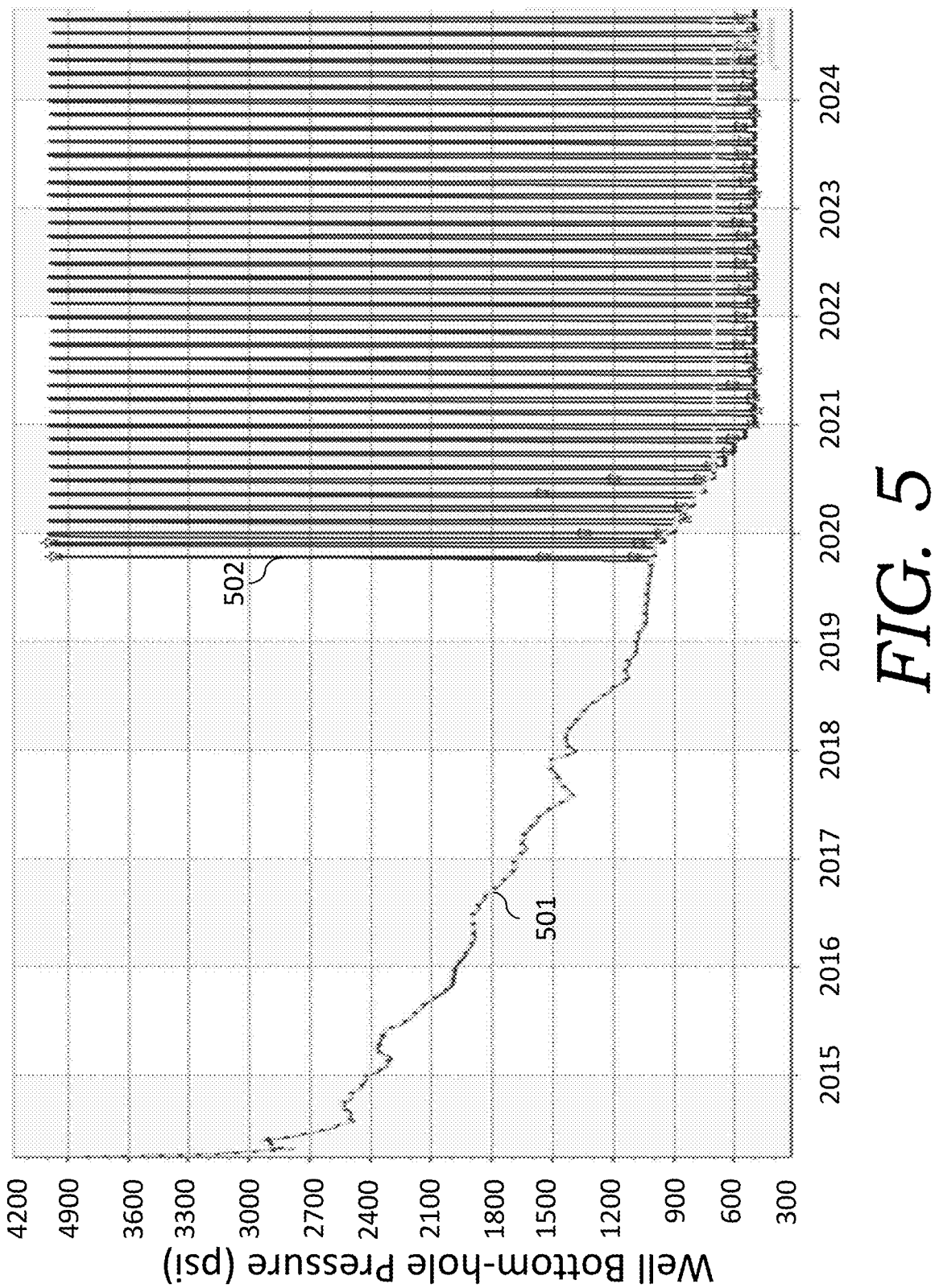
FIG. 5 is a graph that shows near-wellbore simulation block pressures when cyclic injection time is 10 days and cyclic production time is 50 days; when cyclic injection time is 5 days and cyclic production time is 25 days; when cyclic injection time is 10 days, soak time is 10 days, and cyclic production time is 50 days; and when cyclic injection time is 5 days soak time is 5 days and cyclic production time is 25 days.

In all Cases 1-4 outlined above, the cyclic injection and production was assumed to continue for a total period of 5 years. FIG. 5 shows near-wellbore simulation block pressures (shown by plot 502) for a 5 year cyclic injection-production simulation period (beginning near the end of 2019 through near the end of 2024), under the above-described injection and flow periods, with and without soak times. Plot 501 shows decline of the well bottom-hole pressure before the 5-year cyclical period.

Figure 6:
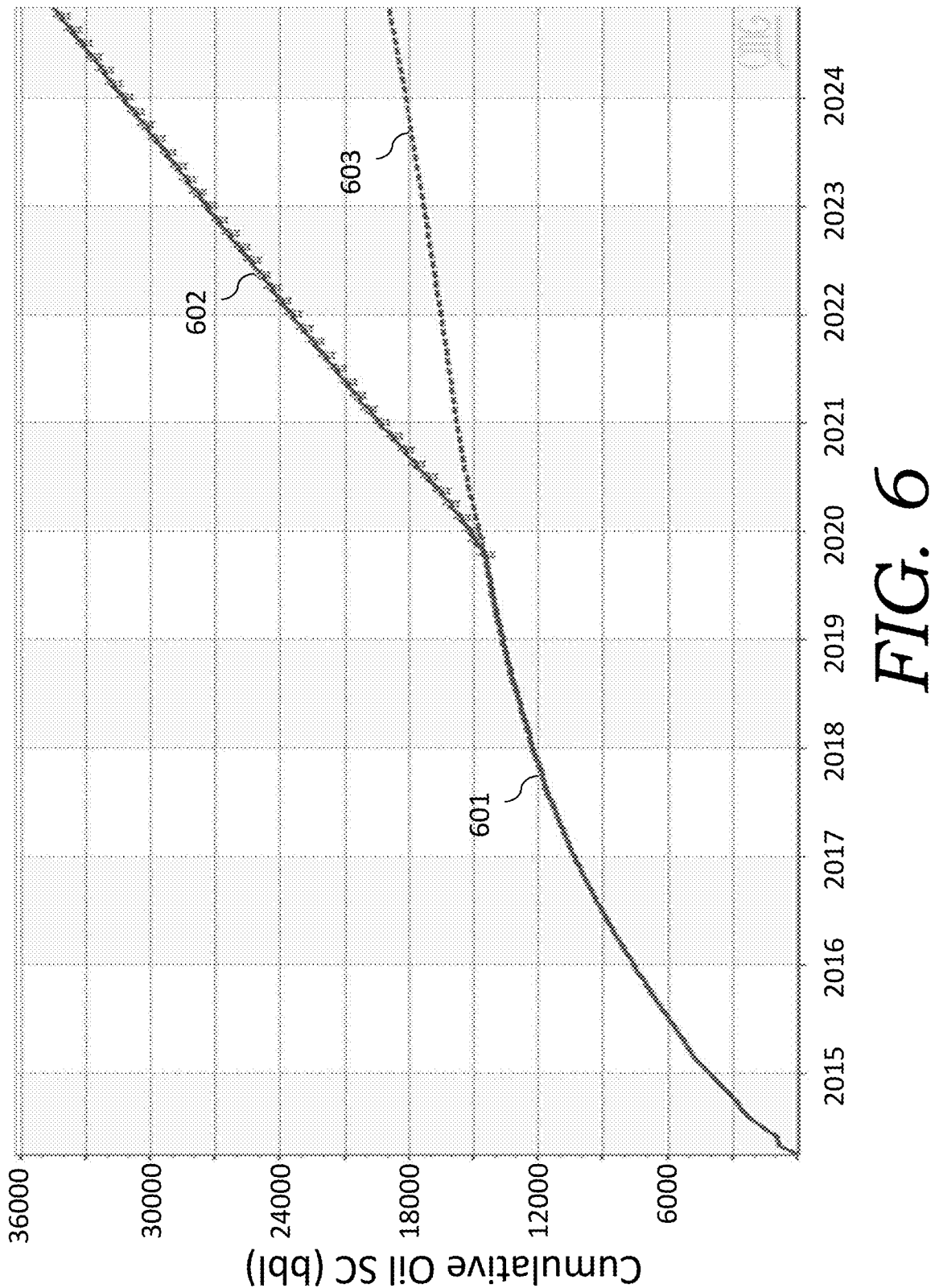
FIG. 6 is a graph indicating oil recovery factor versus time for the reservoir using an embodiment of the present invention.

FIG. 6 is a graph indicating oil recovery factor versus time for the reservoir utilizing case (1) described above (and shown in case (1) in TABLE A). Plot 601 shows the cumulative oil recovered over time before the 5-year cyclical period. Plot 602 shows the cumulative oil recovered over time during the 5-year cyclical period using the cyclic injection of Case 1. Plot 603 shows the cumulative oil recovered over time during the same 5-year period but without cyclic injection.

The summary results of the compositional reservoir simulation modeling of the cyclic EOR process (Cases 1-4) are shown in TABLE A below. Oil recovery was increased by 79.6% to 91.1% versus primary recovery EUR (i.e., an increase of at least 75% and, in some embodiments, an increase of at least 90%). The longer injection and production periods generated slightly greater oil recoveries, and soaking time improved the recovery by approximately 10% versus the cases without soaking time.

TABLE A

| Case | Days Injection-Soak-Flow | Oil Recovery, % Primary EUR |
| --- | --- | --- |
| Case 1 | 10-0-50 | 82.9% |
| Case 2 | 5-0-25 | 79.6% |
| Case 3 | 10-10-50 | 91.1% |
| Case 4 | 5-5-25 | 86.7% |

There are several processes that cause high oil recovery via cyclic injection of propane and butane. During injection, the matrix oil is mobilized by miscibility with the injectant at the matrix/fracture interface due to solvent extraction, which causes countercurrent flow of oil from the matrix. This mechanism is called advection, and is dependent upon pressure and gravity gradients. Oil swelling during injectant exposure causes a reduction in the hydrocarbon density, viscosity and interfacial tension. Injectant/hydrocarbon interaction, miscibility and oil mobility is likewise increased. Gas relative permeability hysteresis improves oil mobilization, as gas relative permeability is lower during the production period than during the injection period. Another mechanism, molecular-diffusion mass transport, complements the advection process and is driven by the chemical potential gradient of the molecular species. In summary, the primary mechanisms that drive the extraction of oil from tight matrix during hydrocarbon gas liquid cyclic injection EOR are repressurization solution gas drive, viscosity and interfacial tension reduction via oil swelling, wettability alteration and relative permeability hysteresis. (Alharthy 2018).

Cyclic injection EOR of rich natural gas hydrocarbons such as propane and butane require their acquisition, transport to the wellsite, storage, and injection using a high pressure pump, such as a triplex pump, configured for such application. The cost of the rich natural gas hydrocarbons such as propane and butane may be a considerable expense to the EOR project that may substantially reduce or preclude its economic viability. However, this expense may be almost completely mitigated by recovering the injectants in a reprocessing equipment package situated on the well pad or in the vicinity of the well, separating them from the produced oil and gas during the puff or production cycle, and storing them for subsequent reinjection during the huff or injection cycle. The reprocessing equipment package may include first stage separation of oil and water liquids, compression, if needed, refrigeration, dehydration and fractionation. The injectant may thereby be completely recovered, with produced oil directed to storage and all gaseous produced hydrocarbons excluding the desired injectant composition directed to sales or midstream processing.

The cyclic EOR process may be optimized by measurement of the injectant and produced fluids composition during each injection and production cycle, running a compositional reservoir simulation model to determine the residual oil composition in the reservoir at the end of each cycle, and adjusting the composition of the injectant in order to optimize the oil recovery in the subsequent injection and production cycle. The compositional reservoir simulation modeling conducted during the cyclic injection may also determine the injection rate, period and pressure; soak time, and production rate, period and pressure in each subsequent injection and production cycle in order to optimize the recovery of oil from the shale reservoir.

The injectant composition may include the addition of liquid surfactants, nano-surfactants, or nanoparticles to reduce interfacial tension, wettability and viscosity. The compositional reservoir simulation modeling may also be conducted so as to mathematically account for changes to interfacial tension, wettability and viscosity by these additives, and thereby further optimize the recovery of oil from the shale reservoir.

RELATED PATENTS AND APPLICATIONS

The following patents and publications relate to the present invention:

U.S. Pat. No. 9,932,808, "Liquid Oil Production from Shale Gas Condensate Reservoirs", applicant Texas Tech University System, Lubbock, Texas and inventor James J. Sheng, Lubbock, Texas.

United States Patent Application Publ. No. 2017/0159416 A1, "Method for Optimization of Huff-N-Puff Gas Injection in Shale Reservoirs", applicant Texas Tech University System, Lubbock, Texas and inventor James J. Sheng, Lubbock, Texas.

United States Patent Application Publ. No. 2018/0347328 A1, "Method for Recovering Hydrocarbons from Low Permeability Formations", applicants Aguilera, Fragoso, Guicheng, Jing, Nexen Energy, Calgary, Canada.

Alharthy, N., Teklu, T, Kazemi, H., Graves, R., Hawthorne, S., Branuberger, J., and Kurtoglu, B., 2018. Enhanced Oil Recovery in Liquid-Rich Shale Reservoirs: Laboratory to Field. SPE 175034 ("Alharthy 2018").

Artun, E., Ertekin, T., Watson, R., Miller, B., 2011. Performance evaluation of cyclic pressure pulsing in a depleted, naturally fractured reservoir with stripper-well production. Petroleum Sci. Technol. 29, 953-965 ("Artun 2011").

Chen, C., Balhoff, B., and Mohanty, K. K., 2014. "Effect of Reservoir Heterogeneity on Primary Recovery and CO, Huff-n-Puff Recovery in Shale-Oil Reservoirs." SPEREE 17 (3), 404-413 ("Chen 2014").

Gamadi, T. D., Sheng, J. J., and Soliman, M. Y. 2013. "An Experimental Study of Cyclic Gas Injection to Improve Shale Oil Recovery", paper SPE 166334 presented at the SPE Annual Technical Conference and Exhibition held in New Orleans, La., USA, 30 September-2 October ("Gamadi 2013").

Kurtoglu, B. 2013. "Integrated reservoir characterization and modeling in support of enhanced oil recovery for Bakken", PhD dissertation, Colorado School of Mines, Golden, Colo. ("Kurtoglu 2013").

Meng, X., Yu, Y. Sheng, J. J. Watson, W., and Mody, F. 2015. "An Experimental Study on Huff-n-Puff Gas Injection to Enhance Condensate Recovery in Shale Gas Reservoirs", paper URTeC 2153322 presented at the Unconventional Resources Technology Conference held in San Antonio, Tex., USA, 20-22 July ("Meng 2015").

Monger, T. G., Coma, J. M., 1988. A laboratory and field evaluation of the CO2 process for light oil recovery. SPE Res. Eng. 3 (4), 1168-1176 ("Monger 1988").

Praxair Technology, Inc. 2014. CO2 Huff in Puff Services for Stimulating Oil Well, at http://www.praxair.com/-/media/praxairus/Documents/SpecificationSheetsandBrochures/Industries/Oil andGas/HuffnPuff.pdf.

Sheng, J. J. and Chen, K. 2014. Evaluation of the EOR Potential of Gas and Water Injection in Shale Oil Reservoirs, Journal of Unconventional Oil and Gas Resources, 5, 1-9 ("Sheng 2014").

Sheng, J. J. 2015. Enhanced oil recovery in shale reservoirs by gas injection, Journal of Natural Gas Science and Engineering, 22, 252-259 (invited review) ("Sheng 2015 A").

Sheng, J. J. 2015. Increase liquid oil production by huff-n-puff of produced gas in shale gas condensate reservoirs, Journal of Unconventional Oil and Gas Resources, 11,19-26 ("Sheng 2015 B").

Sheng, J. J., Cook, T., Barnes, W., Mody, F., Watson, M., Porter, M., Viswanathan, H. 2015. Screening of the EOR Potential of a Wolfcamp Shale Oil Reservoir, paper ARMA 15-438 presented at the 49th US Rock Mechanics/Geomechanics Symposium held in San Francisco, Calif. USA, 28 June-1 July ("Sheng 2015 C").

Shoaib, S., Hoffman, B. T., 2009. CO2 flooding the Elm Coulee field in: Paper SPE 123176 Presented at the SPE Rocky Mountain Petroleum Technology Conference, 14-16 April, Denver, Colo. ("Shoaib 2009").

Wan, T., Sheng, J. J., and Soliman, M. Y. 2013. Evaluation of the EOR Potential in Shale Oil Reservoirs by Cyclic Gas Injection, paper SPWLA-D-12-00119 presented at the SPWLA 54th Annual Logging Symposium held in New Orleans, La., 22-26 June ("Wan 2013 A").

Wan, T., Sheng, J. J., and Soliman, M. Y. 2013. Evaluation of the EOR Potential in Fractured Shale Oil Reservoirs by Cyclic Gas Injection, paper SPE 168880 or URTeC 1611383 presented at the Unconventional Resources Technology Conference held in Denver, Colo., USA, 12-14 Aug. 2013 ("Wan 2013 B").

Wan, T., Meng, X. Sheng, J. J. Watson, M. 2014. Compositional Modeling of EOR Process in Stimulated Shale Oil Reservoirs by Cyclic Gas Injection, paper SPE 169069 presented at the SPE Improved Oil Recovery Symposium, 12-16 April, Tulsa, Okla. ("Wan 2014 A").

Wan, T., Yu, Y., and Sheng, J. J. 2014b. Comparative Study of Enhanced Oil Recovery Efficiency by CO2 Injection and CO2 Huff-n-Puff in Stimulated Shale Oil Reservoirs, paper 358937 presented at the AIChE annual meeting, Atlanta, Ga., USA, 16-21 November ("Wan 2014 B").

Wan, T., Yu, Y., and Sheng, J. J. 2015. Experimental and Numerical Study of the EOR Potential in Liquid Rich Shales by Cyclic Gas Injection, submitted to J. of Unconventional Oil and Gas Resources ("Wan 2015").

Wang, X., Luo, P., Er, V, Huang, S. 2010. Assessment of CO Flooding Potential for Bakken Formation, Saskatchewan, paper SPE-137728-MS presented at the Canadian Unconventional Resources and International Petroleum Conference, 19-21 October, Calgary, Alberta, Canada ("Wang 2010").

Yu, W., Lashgari, H., Sepehrnoori, K. 2014. Simulation Study of CO2 Huff-n-Puff Process in Bakken Tight Oil Reservoirs, paper SPE 169575-MS presented at the SPE Western North American and Rocky Mountain Joint Meeting, 17-18 April, Denver, Colo. ("Yu 2014").

Yu, Y and Sheng, J. J. 2015. An Experimental Investigation of the Effect of Pressure Depletion Rate on Oil Recovery from Shale Cores by Cyclic N2 Injection, paper URTeC 2144010 presented at the Unconventional Resources Technology Conference held in San Antonio, Tex., USA, 20-22 July ("Yu 2015").

Cyclic stream stimulation design, July 2015, at http://petrowiki.org/Cyclic steam stimulation design.

The disclosures of all patents, patent applications, and publications cited herein are hereby incorporated herein by reference in their entirety, to the extent that they provide exemplary, procedural, or other details Supplementary to those set forth herein.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A method to increase the recovery of oil from shale reservoirs utilizing a cyclic injection and production process that comprises a plurality of injection and production periods, wherein each of the plurality of injection and production periods comprises an injection period and a production period, and wherein the method comprises the steps of:

(a) determining a hydrocarbon-containing composition for injection to be utilized during a first set of injection and production periods of the plurality of injection and production periods, wherein the hydrocarbon-containing composition comprises a fluid selected from a group consisting of aliphatic hydrocarbons, components of natural gas that are is in a liquid state at surface injection conditions, and combinations thereof;

(b) determining a maximum injection rate and a maximum injection pressure in a well to be utilized during the injection period in each injection and production period of the first set of injection and production periods;

(c) determining a maximum production rate of gases and liquids from the well and a minimum production pressure during the production period in each injection and production period of the first set of injection and production periods;

(d) during the injection period in each injection and production period of the first set of injection and production periods, injecting the hydrocarbon-containing composition for a period of time such that the pressure near a wellbore of the well reaches the determined maximum injection pressure during the injection period;

(e) during the production period in each injection and production period of the first set of injection and production period, producing the well for a period of time to produce fluids, such that the pressure at the wellbore reaches the determined minimum production pressure;

(f) processing the produced fluids at the surface to remove hydrocarbons from the produced fluids;

(g) performing steps (d)-(f) for each of the injection and production periods in the first set of injection and production periods;

(h) at or during end of the first set of injection and production periods, assessing the composition of the produced fluids and recalibrating a reservoir simulation model to determine the composition of the residual oil in the shale reservoir;

(i) adjusting the composition of the hydrocarbon-containing injection fluids to adjusted hydrocarbon-containing injection fluids; and (j) performing the process of steps (b) through (i) repeatedly for one or more subsequent sets of injection and production periods, wherein the adjusted hydrocarbon-containing injection fluids is utilized as the hydrocarbon-containing injection fluids in each subsequent set of the one or more subsequent sets of injection and production periods.

2. The method of claim 1, wherein the hydrocarbon-containing composition comprises a fluid selected from a group consisting of aliphatic hydrocarbons.

3. The method of claim 2, wherein the hydrocarbon-containing composition comprises an aliphatic hydrocarbon is selected from the group consisting of ethane, propane, butane, heptane, and hexane.

4. The method of claim 1, wherein the hydrocarbon-containing composition comprises a fluid comprising one or more components of natural gas that are in a liquid state at surface injection conditions.

5. A method to increase the recovery of oil from shale reservoirs utilizing a cyclic injection and production process that comprises a plurality of injection and production periods, wherein each of the plurality of injection and production periods comprises an injection period and a production period, and wherein the method comprises the steps of:

(a) determining a hydrocarbon-containing composition for injection to be utilized during a first set of injection and production periods of the plurality of injection and production periods, wherein the hydrocarbon-containing composition is in a liquid state at surface injection conditions;

(b) determining a maximum injection rate and a maximum injection pressure in a well to be utilized during the injection period in each injection and production period of the first set of injection and production periods;

(c) determining a maximum production rate of gases and liquids from the well and a minimum production pressure during the production period in each injection and production period of the first set of injection and production periods;

(d) during the injection period in each injection and production period of the first set of injection and production periods, injecting the hydrocarbon-containing composition and one or more additional injection fluids for a period of time such that the pressure near a wellbore of the well reaches the determined maximum injection pressure during the injection period;

(e) during the production period in each injection and production period of the first set of injection and production period, producing the well for a period of time to produce fluids, such that the pressure at the wellbore reaches the determined minimum production pressure;

(f) processing the produced fluids at the surface to remove hydrocarbons from the produced fluids;

(g) performing steps (d)-(f) for each of the injection and production periods in the first set of injection and production periods;

(h) at or during end of the first set of injection and production periods, assessing the composition of the produced fluids and recalibrating a reservoir simulation model to determine the composition of the residual oil in the shale reservoir;

(i) adjusting the composition of the hydrocarbon-containing injection fluids to adjusted hydrocarbon-containing injection fluids, wherein the adjusted hydrocarbon-containing composition is in a liquid state at surface injection conditions; and (j) performing the process of steps (b) through (i) repeatedly for one or more subsequent sets of injection and production periods, wherein the adjusted hydrocarbon-containing injection fluids is utilized as the hydrocarbon-containing injection fluids in each subsequent set of the one or more subsequent sets of injection and production periods.

6. The method of claim 5, wherein, during the injection period in each injection and production period of the first set of injection and production periods, the one or more additional injection fluids comprises an additional injection fluid that is injected after injection of the hydrocarbon-containing composition.

7. The method of claim 6, wherein the additional injection fluid comprises water.

8. The method of claim 7, wherein the additional injection fluid further comprises a material selected from the group consisting of liquid surfactants, nano-surfactants, nanoparticles, and combinations thereof.

9. The method of claim 6, wherein the additional injection fluid comprises a gas at the surface injection conditions.

10. The method of claim 9, wherein the gas is selected from the group consisting of nitrogen, carbon dioxide, methane, ethane, and carbon monoxide.

11. The method of claim 9, wherein during the injection period in each injection and production period of the first set of injection and production periods, the one or more additional injection fluids comprises a second additional injection fluid that is injected after injection of the additional injection fluid.

12. The method of claim 6, wherein the second additional injection fluid comprises water.

13. The method of claim 12, wherein the additional injection fluid further comprises a material selected from the group consisting of liquid surfactants, nano-surfactants, nanoparticles, and combinations thereof.

14. The method of claim 13, wherein the gas is selected from the group consisting of nitrogen, carbon dioxide, methane, ethane, and carbon monoxide.

15. The method of claim 6, wherein the additional injection fluid comprises (a) water and (b) a gas at the surface injection conditions.

16. The method of claim 15, wherein the additional injection fluid further comprises a material selected from the group consisting of liquid surfactants, nano-surfactants, nanoparticles, and combinations thereof.

17. The method of claim 16, wherein the gas is selected from the group consisting of nitrogen, carbon dioxide, methane, ethane, and carbon monoxide.

18. The method of claim 15, wherein the gas is selected from the group consisting of nitrogen, carbon dioxide, methane, ethane, and carbon monoxide.

19. A method to increase the recovery of oil from shale reservoirs utilizing a cyclic injection and production process that comprises a plurality of injection and production periods, wherein each of the plurality of injection and production periods comprises an injection period and a production period, and wherein the method comprises the steps of:

(a) determining a hydrocarbon-containing composition for injection to be utilized during a first set of injection and production periods of the plurality of injection and production periods, wherein the hydrocarbon-containing composition is in a liquid state at surface injection conditions;

(b) determining a maximum injection rate and a maximum injection pressure in a well to be utilized during the injection period in each injection and production period of the first set of injection and production periods;

(c) determining a maximum production rate of gases and liquids from the well and a minimum production pressure during the production period in each injection and production period of the first set of injection and production periods;

(d) during the injection period in each injection and production period of the first set of injection and production periods, thermally injecting the hydrocarbon-containing composition for a period of time such that the pressure near a wellbore of the well reaches the determined maximum injection pressure during the injection period;

(e) during the production period in each injection and production period of the first set of injection and production period, producing the well for a period of time to produce fluids, such that the pressure at the wellbore reaches the determined minimum production pressure;

(f) processing the produced fluids at the surface to remove hydrocarbons from the produced fluids;

(g) performing steps (d)-(f) for each of the injection and production periods in the first set of injection and production periods;

(h) at or during end of the first set of injection and production periods, assessing the composition of the produced fluids and recalibrating a reservoir simulation model to determine the composition of the residual oil in the shale reservoir;

(i) adjusting the composition of the hydrocarbon-containing injection fluids to adjusted hydrocarbon-containing injection fluids, wherein the adjusted hydrocarbon-containing composition is in a liquid state at surface injection conditions; and (j) performing the process of steps (b) through (i) repeatedly for one or more subsequent sets of injection and production periods, wherein the adjusted hydrocarbon-containing injection fluids is utilized as the hydrocarbon-containing injection fluids in each subsequent set of the one or more subsequent sets of injection and production periods.

20. The method of claim 19, wherein the step of thermally injecting the hydrocarbon-containing composition comprises utilizing steam, hot water, a hot solvent, or a combination thereof.

\* \* \* \* \*